United States Patent [19]
Harms

[11] 3,971,153
[45] July 27, 1976

[54] DEVICE FOR USE WITH FISHING TACKLE

[76] Inventor: John F. Harms, 6418 Stony Brook Drive, Fort Wayne, Ind. 46815

[22] Filed: Apr. 30, 1975

[21] Appl. No.: 573,583

[52] U.S. Cl. ............................................... 43/43.13
[51] Int. Cl.² ........................................ A01K 91/00
[58] Field of Search .............. 43/43.13, 43.1, 42.46, 43/4

[56] References Cited
UNITED STATES PATENTS

| | | | |
|---|---|---|---|
| 2,003,245 | 5/1935 | Carey | 43/43.13 |
| 2,700,841 | 2/1955 | Johnson et al. | 43/42.46 |
| 2,967,372 | 1/1961 | Pass et al. | 43/43.13 |
| 3,012,358 | 12/1961 | Multanen | 43/42.46 |
| 3,145,498 | 8/1964 | Kochis | 43/43.13 |
| 3,156,065 | 11/1964 | Klammer | 43/43.13 |

*Primary Examiner*—Warner H. Camp
*Attorney, Agent, or Firm*—Albert L. Jeffers; Roger M. Rickert

[57] ABSTRACT

A device for use with fishing tackle, and especially a device for use in removing the twist from a fishing line, and especially from a monofilament fishing line. The device comprises a body having a connector for connecting the body to the end of a fishing line with the body having rib means or fin means thereon which cause it to rotate when it is drawn through the water by the line connected thereto. The body has two points of connection and rotates in a respective direction for each point to which the line is connected. The body may be in the form of a round body and the fins may be flat fins mounted on opposite sides of the body or the body may be provided with angular grooves forming ribs on the body with the points of connection being selected with reference to the ribs to provide for a respective rotation of the body for each of the connecting points.

5 Claims, 6 Drawing Figures

DEVICE FOR USE WITH FISHING TACKLE

The present invention relates to a device for use with fishing tackle and, in particular, relates to a device for use in removing twist from a fishing line.

A problem that is encountered in connection with fishing, especially in trolling and casting, is line twist. This problem is particularly troublesome when using light weight monofilament plastic fishing lines, and especially when such a line is used with a spinning or a spin casting reel.

Many times, the action of the bait, whether it be natural or artificial, results in rotation of the bait as it is drawn through the water, and this will impart twist to the line in one direction. The twist can build up to a substantial amount over a period of time. Further, due to the construction of spinning reels and spin casting reels, line twist tends to develop in the line, especially as it is drawn off from the reel.

When line twist becomes excessive, the line will tend to snarl or twist up, and this condition can become so severe that knotting results that is so difficult to correct that it is necessary to cut the line. This is, of course, most undesirable for any line, and especially for a monofilament line.

With the foregoing in mind, a primary objective of the present invention is the provision of a device and a method of using the device which will remove line twist from a fishing line even without removing the line from the reel or rod.

Another objective of the present invention is the provision of a device of the nature referred to above which is inexpensive to manufacture and simple to use and which is adapted for use with any type of fishing line and fishing equipment.

BRIEF SUMMARY OF THE INVENTION

According to the present invention, a body is provided which can either be buoyant or nonbuoyant and which has two spaced connecting points thereon and to either of which a fishing line can be connected in a nonrotatable manner as by tieing. The body is provided with fins or raised ribs or ribs formed by recesses in the body which extend angularly with respect to the points of connection so that for each point of connection of the line to the body, the body will rotate in a respective direction when drawn through the water.

In use, a fishing line is connected to a respective one of the connecting points on the body, depending on the twist in the line, and is then cast into the water and is then reeled back in. The rotation of the body in the water due to the fins thereon causes the line to be rotated at the body end in a direction to remove the twist in the line.

The body is advantageously round for convenience of manufacture, but it can be in the shape of a cube or any other shape which is convenient to produce.

The exact nature of the present invention will become more apparent upon reference to the following detailed specification taken in connection with the accompanying drawings in which.

DETAILED DESCRIPTION OF THE INVENTION

Figure 1:
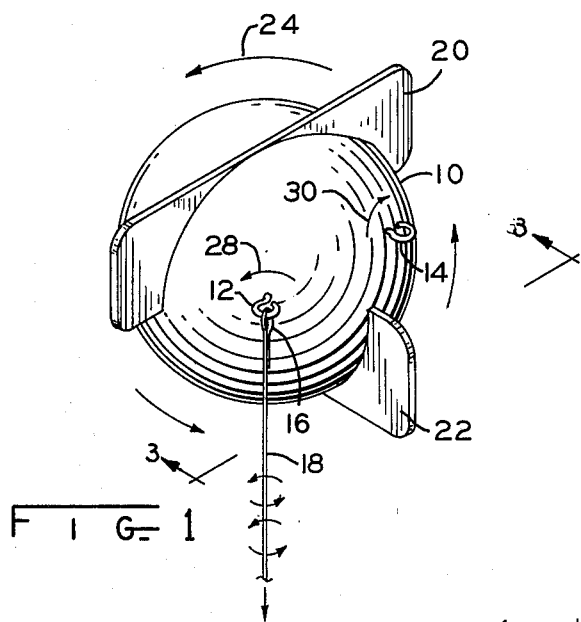
FIG. 1 is a perspective view of a device according to the present invention looking directly in at one of the connecting points provided on the device.
Figure 2:
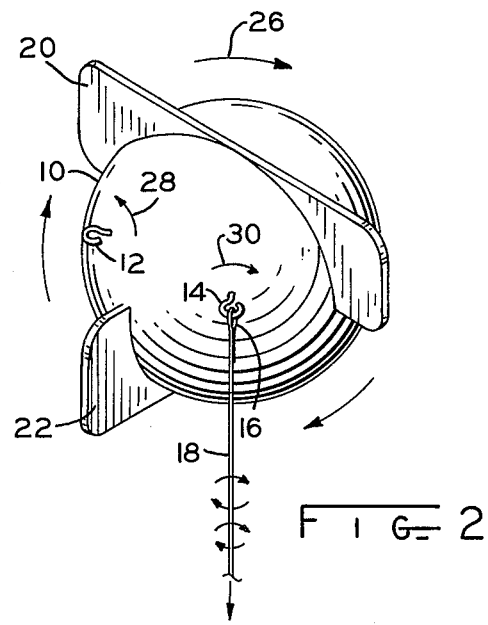
FIG. 2 is a view like FIG. 1 but looking directly in at the other connecting point.
Figure 3:
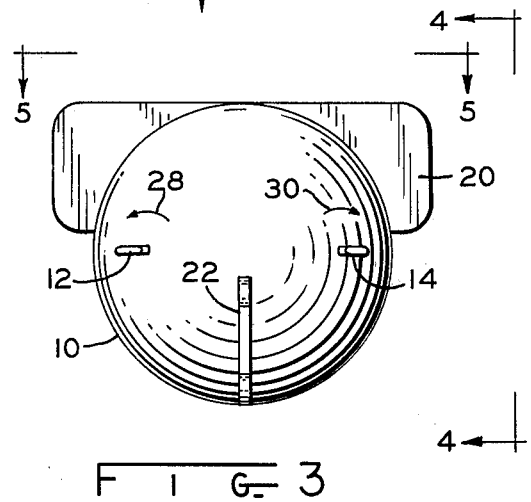
FIG. 3 is an elevational view indicated by line III—III on FIG. 1.
Figure 4:
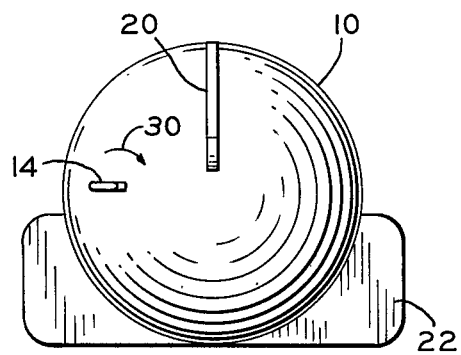
FIG. 4 is an elevational view looking in from the side of FIG. 3 as indicated by line IV—IV thereon.

Referring to the drawings somewhat more in detail, in FIGS. 1 to 5, 10 indicates the body of the device. It will be seen that the body 10 is substantially spherical although, as mentioned, it can be any shape desired as long as means are provided for causing rotation of the body in a desired direction as it is drawn through the water.

In the drawings, the body is provided with connectors 12 and 14 which are spaced apart as, for example, in a central plane of the body. Connectors 12 and 14 may consist of screw eyes or the like through which a line can be threaded and knotted or which will receive a loop 16 formed on the end of line 18.

The modification of FIGS. 1 to 5 includes ribs or fins 20 and 22 which are flat elements fixed to or imbedded in slots formed in body 10. The planes of the fins 20 and 22 are perpendicular to each other and are also perpendicular to the central plane of body 10 in which the connectors 12 and 14 are located. Advantageously, the planes of fins 20 and 22 are also central planes of body 10 and one of the planes, for example, the plane of fin 20 passes midway between connectors 12 and 14.

When line 18 is attached to connector 12, and the device is cast into the water and then drawn through the water, the movement of the water over the forwardly facing surfaces of fins 20 and 22 cause the body to rotate in the water in the direction of the arrow 24, namely, in a counterclockwise direction as viewed from the line side of the body.

However, when the line 18 is connected to connector 14, the inclination of the fins 20 and 22 relative to the direction in which the body is drawn through the water is reversed and the body now rotates in the direction of arrow 26, namely, in the clockwise direction as it is viewed from the line side. Advantageously, the directions of rotation of the body pertaining to the respective connectors is indicated by the arrows 28 and 30 formed or imprinted on the body.

The particular size of the fins is not important as long as they protrude from the body sufficiently far to cause the above referred to rotation to take place as the body is drawn through the water.

Figure 5:
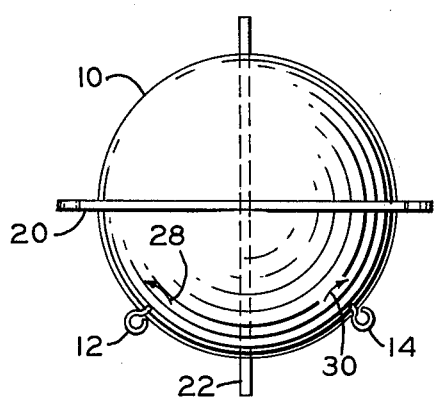
FIG. 5 is an elevational view looking down on top of FIG. 3 as shown by line V—V thereon.
Figure 6:
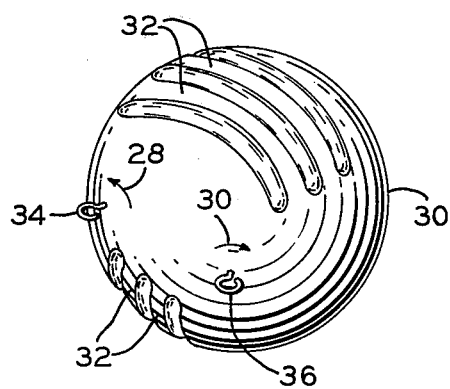
FIG. 6 is a view like FIG. 1 but showing the formation of ribs or grooves on the body to form the rotating elements thereon.

FIGS. 1 through 5 show flat fins as the elements which cause rotation of the body, but it is also possible to form the body as shown in FIG. 6 with ribs integral therewith or to define ribs on the body by angular grooves formed in the body. In FIG. 6, body 30 is provided with angular rib portions 32 which, as mentioned, may be in the form of rib-like protrusions on the body or may be defined by grooves formed in the body. In either case, the body 30 will rotate in a respective direction depending on which one of connectors 34 and 36 is employed for connection to the fishing line.

As will be seen in FIG. 5, the fins are advantageously perpendicular to one another while the connecting points 12 and 14 may be midway between the planes of the fins. The exact relationship of the fins to each other and to the connecting points is not critical, but a symmetrical arrangement is preferred so that the rotation of the body in one direction will be about the same as the rotation of the body in the other direction thereby providing for predictable results when the body is drawn through the water.

In use, the device can be drawn through the water by the line until the twist is removed from the line or, if the operator wishes, some twist can even be imparted to the line in the opposite direction in the form of over-correction, thus, prolonging the time until the line must be again untwisted.

Modifications may be made within the scope of the appended claims.

What is claimed is:

1. A device for restoring the lay of a line, such as a fishing line, comprising:
   a spherical body having an outer surface and a central plane and being adapted to be drawn through water;
   a pair of line attaching means non-rotatably fixed to said body and located in said central plane for non-rotatably attaching a line to said body so that said body can be drawn through the water;
   first and second ribs located in first and second planes respectively and attached to said body to extend outwardly from said outer surface to contact the water and be acted upon by the water in a manner to cause rotation of said body as it is drawn through the water, said first and second planes being essentially perpendicular to each other and to said central plane;
   said attaching means being fixed to said body for rotation therewith so that rotation of said body causes rotation of the line in one direction when it is attached to a first one of said pair of attaching means, and rotation of the line in an opposite direction when it is attached to the other one of said pair of attaching means, said attaching means being essentially symmetrically located on said body with respect to said ribs, so that line rotation in both directions is essentially uniform.

2. A device according to claim 1 in which said ribs comprise fins mounted on said body and projecting therefrom.

3. A device according to claim 1 in which said ribs comprise fins mounted on said body and projecting therefrom, said fins including first and second fins on opposite sides of said body, the plane of one of said fins being located between said pair of line attaching means.

4. A device according to claim 3 in which the planes of said ribs are also central planes of said body with the plane of one rib being located midway between said attaching means.

5. A device according to claim 1 in which said ribs are formed on said body by spaced groove means formed in the body.

* * * * *